United States Patent [19]

Albanese

[11] Patent Number: 4,514,843
[45] Date of Patent: Apr. 30, 1985

[54] PACKET SWITCHED COMMUNICATION SYSTEM COMPRISING COLLISION AVOIDANCE MEANS

[75] Inventor: Andres Albanese, Middletown, N.J.

[73] Assignee: AT&T Bell Laboratories, Murray Hill, N.J.

[21] Appl. No.: 446,191

[22] Filed: Dec. 2, 1982

[51] Int. Cl.³ .......................... H04J 6/00; H04Q 11/04
[52] U.S. Cl. ........................................... 370/93; 370/85
[58] Field of Search ...................... 340/825.5, 825.51; 370/93, 85, 94, 86; 455/58

[56] References Cited

U.S. PATENT DOCUMENTS

| | | | |
|---|---|---|---|
| 2,662,974 | 12/1953 | Dorff | 455/58 |
| 4,063,220 | 12/1977 | Metcalfe et al. | 340/147 |
| 4,199,661 | 4/1980 | White et al. | 370/91 |
| 4,262,357 | 4/1981 | Shima | 370/85 |
| 4,366,480 | 12/1982 | Van Hatten | 370/85 |
| 4,417,334 | 11/1983 | Gunderson et al. | 370/85 |
| 4,439,856 | 3/1984 | Ulug | 370/85 |

Primary Examiner—Douglas W. Olms
Assistant Examiner—Wellington Chin
Attorney, Agent, or Firm—Eugene E. Pacher; Sylvan Sherman

[57] ABSTRACT

The efficiency of packet switching networks is improved by using a collision avoidance technique rather than collision detection. The subscriber links are connected to a common node. A collision avoidance circuit in each link monitors the node to determine whether it is in a busy or idle status. The first message to arrive places the node in a busy status at which time all other, nontransmitting links are disconnected, thereby avoiding a collision. Later arriving messages are stored in buffers at each subscriber location and are transmitted when the node is again idle. In this manner messages are transmitted on a first-come basis, and can be of arbitrary duration regardless of bit rate.

10 Claims, 6 Drawing Figures

PACKET SWITCHED COMMUNICATION SYSTEM COMPRISING COLLISION AVOIDANCE MEANS

TECHNICAL FIELD

This invention relates to multiple-access communication systems.

BACKGROUND OF THE INVENTION

In a typical multiple-access communication system such as, for example, packet switching systems, access to the network is by demand. That is, each user seeks to use the network as the need arises, and the transmission is broadcast to all the other users. Address information is contained in a header as part of the transmitted information and the receiving stations listen to the transmissions from all participating members of the network. Each selects that information which is directed to it.

The most common method of allocating resources in packet switching system is by contention, which gives rise to a serious problem when two or more stations attempt to transmit simultaneously. (See U.S. Pat. No. 4,063,220). When this occurs, the transmissions from all the contending stations are garbled and none is properly received by the addressees. Clearly, some means must be provided so that each subscriber can ascertain when this has occurred and, thereby, know when the lost data must be retransmitted. The most common method is for the transmitting station to listen as it transmits, and to be sure it receives a correct replica of what was transmitted. However, in order for this test to have validity, the minimum packet duration must be at least as long as the total transmit time across the network or else virtual destruction of transmissions could occur at one point in the network and be undetected at another. At low bit rates and over small distances, this minimum packet size restriction is of little consequence. However, as bit rates increase, and as network dimensions increase, this constraint may well impose a minimum packet size which is larger than the customer needs.

Another disadvantage of packet-switch systems is that it is inherently inefficient in its use of facilities. In a simple contention system where the packet duration is shorter than the propagation time, the maximum throughput is about 18 percent of the nominal system capacity. In more sophisticated systems, this efficiency may increase to about 36 percent. A further disadvantage, and perhaps the most serious of all is that on overload, packet-switched contention systems degrade most ungracefully. As the network gets more and more crowded, the number of improperly received transmissions increases and, therefore, the number of retransmissions increases. This only serves to add additional load to the already overloaded system. The result is often devastating.

To avoid these limitations various techniques are employed whereby the network is made available to the users in accordance with some sort of plan. For example, in U.S. Pat. No. 4,199,661 the nontransmitting stations are locked out when the channel is active. To avoid two or more users seizing the channel when it becomes idle, each station is inhibited from transmitting for some unique, predetermined period of time. That is, a priority system is imposed upon the users. While this may work well for high priority users, it can, in effect, prevent lower priority users from getting access to the network during busy periods.

SUMMARY OF THE INVENTION

A multiple-access communication system, in accordance with the present invention, employs a collision avoidance technique in which access to the network is provided on a first-come, first-serve basis. A plurality of user links are terminated at a common node whose status is constantly monitored. The first packet to arrive captures the node, which goes from "idle" to "busy", and the packet is broadcast to all users. Packets that arrive when the common node is "busy" are not broadcast. Instead, they are stored in buffers at the user stations and are automatically retransmitted until the node is once again idle and the transmission is finally broadcast.

A similar technique is also employed to control traffic between pairs of remote nodes.

DETAILED DESCRIPTION

Figure 1:
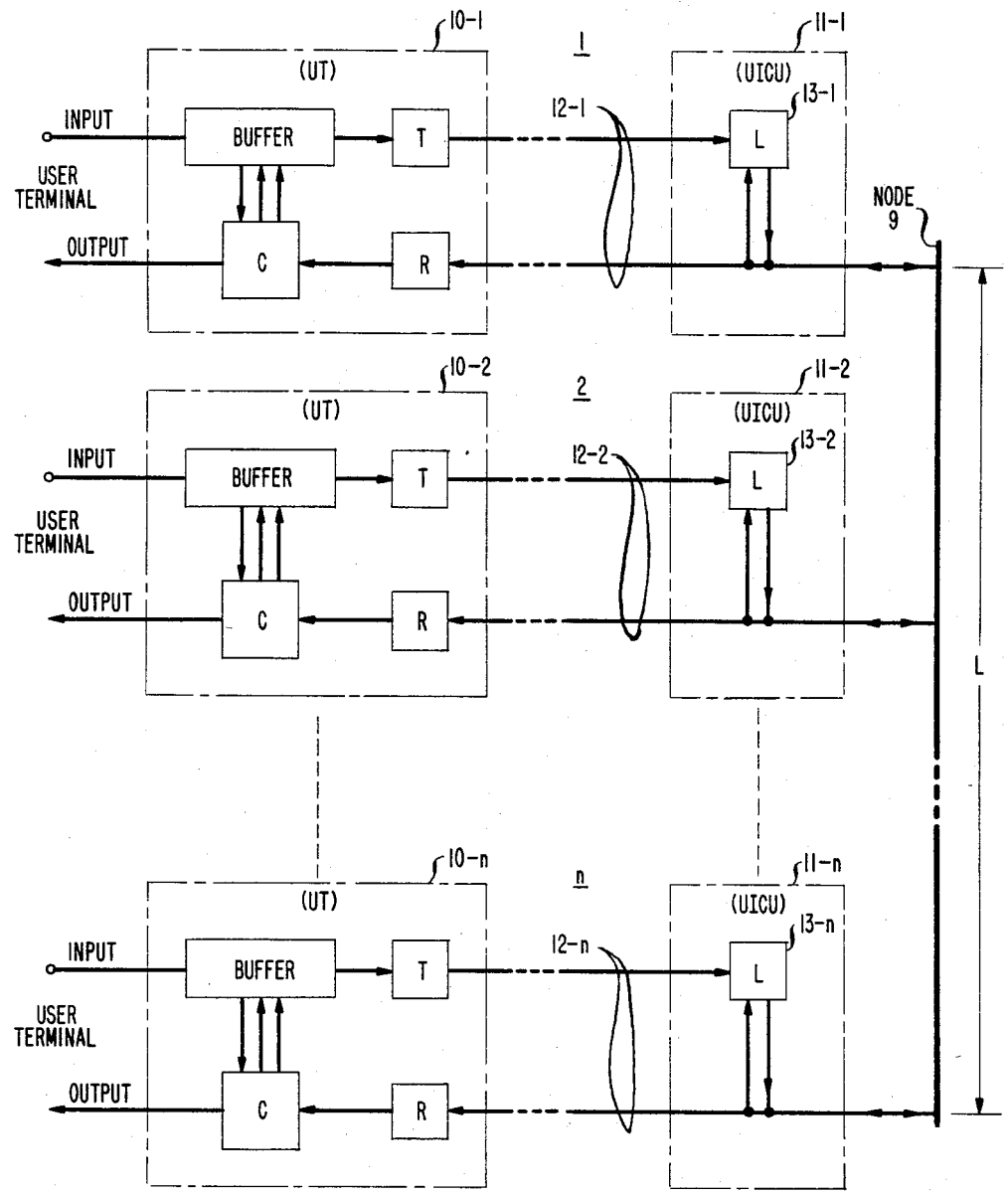
FIG. 1 shows a multiple-access local area network with collision avoidance in accordance with the present invention.

Referring to the drawings, FIG. 1 shows a multiple-access local area network with collision avoidance in accordance with the present invention. In this network, a plurality of user links 1,2, . . . n, are connected to a common node 9 consisting of a length l of bus, given by $$1 \leq vT/2, \quad (1)$$

where v is the velocity of signal propagation; and
T is the bit period.

Each of the user links, in turn, comprises a user terminal (UT) 10-1, 10-2, . . . 10-n, a user interface control unit (UICU) 11-1, 11-2, . . . 11-21 and a transmission link 12-1, 12-2, . . . 12-n for communicating between each UT and its associated UICU. Physically, each UT is conveniently located wherever the data signals to be transmitted originate. The UICUs are advantageously located at the node 9.

As explained above, the instant circuit is designed to avoid collisions among messages. This is accomplished by the UICU which monitors the node to determine its status, i.e., "idle" or "busy", and takes the appropriate action in response to this determination. In particular, the UICU protocol is as follows:

(a) The UICU provides a connection between the node and the receiver at the user terminal at all times. Thus, all the users receive all messages broadcast by the node.

(b) All user transmitters are disconnected from the node.

(c) Each user transmitter and the node are continuously monitored for "idle" or "busy" status.

(d) When a packet from a user transmitter is received by its associated UICU, the latter becomes "busy". If, at the same time, the node is idle, the UICU connects the transmitter to the node thereby changing the node status to "busy". If, on the other hand, the transition of the UICU from "idle" to "busy" occurred when the node was "busy", the transition would be ignored and the transmitter would remain disconnected. In this way, only the transmitter with the first arriving packet is connected to the node, while all others are and remain disconnected.

(e) The node status returns to "idle" when the broadcast packet ends and the broadcasting transmitter is disconnected.

This protocol is performed by the logic circuit 13-1, 13-2, . . . 13-n in the respective UICUs. An illustrative embodiment of logic circuit 13-i, shown in FIG. 2, comprises four flip-flops 19, 20, 21 and 22 and an AND-gate 23. The former are designated in the Figure as transmitter monitor, arbiter, hold-on and broadcast node monitor, respectively.

In operation, the node monitor 22, which is a retriggerable, monostable multivibrator, detects the presence or absence of a signal on the node. When the node is "busy", the flip-flop is triggered and output terminal Q4 goes high. When the node is "idle", Q4 is low. Conversely, $\overline{Q4}$ is low when the node is "busy" and high when it is "idle".

The transmitter monitor is also a retriggerable monostable multivibrator which is switched from low to high by the signal pulses and will remain high for a specified time $t_1$, following the last triggering pulse.

The arbiter 20 is a D-type flip-flop which transfers data on the D terminal to the output terminal Q2 on the low to high transition of the clock pulse. Inasmuch as the D terminal is permanently high, the arbiter output terminal Q2 goes high when the transmitter monitor output terminal Q1 goes high while R is low. This, in turn, sets the hold-on flip-flop output terminal Q3 high. However, if the node is "busy", the node monitor Q4 terminal will be high, resetting the arbiter flip-flop and, thereby, preventing Q2 from going high. Absent a set signal, Q3 remains low and the AND-gate is disabled, thus preventing transmission onto the "busy" node.

Figure 3:
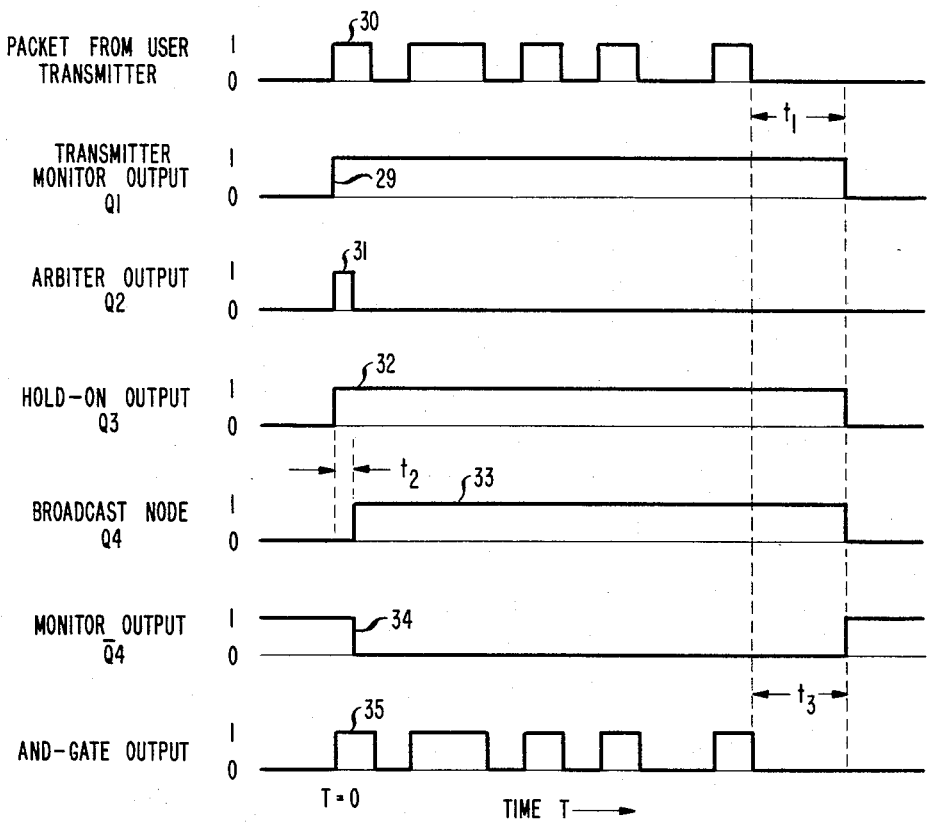
FIG. 3 is a timing diagram showing signal conditions at various points in the logic circuit.

FIG. 3 is a timing diagram showing signal conditions at various points in the circuit.

Before time zero it is assumed that the node is "idle" and no signal is being transmitted. At time T=0, a signal, given by curve 30, is transmitted by the user transmitter. This signal is coupled through a delay circuit 27 to one terminal of AND-gate 23 and to the C1 terminal of the transmitter monitor 19. The first pulse triggers the flip-flop, which remains switched for a specified period of time which is long compared to the bit rate. Thus, successive pulses in the packet retrigger the flip-flop and Q1 remains high for a period of time, $t_1$, following the final pulse. This is indicated by curve 29 which is the output signal at terminal Q1 of the transmitter monitor. The signal at Q1 is applied to terminal C2 of the arbiter flip-flop 20. With the node "idle", Q4 is low. As a consequence, on the low to high transition of C2, Q2 goes high, as illustrated by curve 31. This "sets" hold-on flip-flop 21 and Q3 goes high, as shown by curve 32. With Q3 high the AND-gate is enabled, and the transmission is broadcast, as indicated by curve 35. The broadcast is sensed by node monitor 22 which switches such that Q4 goes high, resetting arbiter 20 driving Q2 low, as shown in 31. The delay, $t_2$, is the time it takes for a signal to propagate through flip-flops 20 and 21, gate 23, and flip-flop 22.

After the transmission ends, the node-monitor waits a specified period of time, $t_3$, before deciding the node is "idle", after which it switches, driving Q4 low and $\overline{Q4}$ high. The latter clocks the hold-on flip-flop low, disabling the AND-gate and restoring the UICU to its stand-by state.

If, on the other hand, the node is "busy" when the signal (i.e., curve 30) is transmitted by the user, Q4 is high and the arbiter output Q1 is, and remains low. With Q2 low, the output, Q3, from the hold-on flip-flop is also low, and the AND-gate is disabled.

It is possible that two signals will arrive at their respective UICUs at about the same time. This would be a relatively rare event inasmuch as it only takes about 20 nanoseconds to determine who arrived first. However, assuming that two packets arrive within 20 nanoseconds of each other, a collision would be possible because both would be broadcast simultaneously. To avoid the possibility of a collision in this rare event, the logic circuit can be modified by the addition of an exclusive OR-gate 25, shown in broken line in FIG. 2. As shown, the input terminals of gate 25 are connected to the user transmitter and to the node. The output terminal of gate 25 is connected to the reset terminal of hold-on flip-flop 21. In operation, gate 25 compares the transmitted signal and the node signal. So long as they are the same, as in the case of a single transmission being broadcast, gate 25 is disabled. However, if two transmitters are broadcasting, the signals applied to the node by the two transmitters will tend to differ. Thus, the two transmitters remain connected until the signal of one differs from that of the other. In particular, the transmitter broadcasting the first low bit, which drives the node low, will remain connected. The exclusive OR-gate in the UICU of the other transmitting link will sense that the node has gone low and will reset its associated hold-on flip-flop, thus disconnecting that link from the node.

Delay networks 26 and 27 are included, as required, to provide the necessary delay compensation for proper operation.

If a transmission is blocked because the node is "busy", the signal must be retransmitted. Accordingly, each user terminal 10 is provided with a buffer stage to store the packet, and some means for determining if the packet had been broadcast. Thus, the user protocol is as follows:

(a) Store the packet in a buffer and transmit at once (b) Wait the user's round trip time from transmitter to node, and then back to user's receiver (c) Compare the received signal with packet stored in the buffer (d) If different, retransmit packet and repeat (2) and (3)

(e) If the same, clear buffer.

Figure 4:
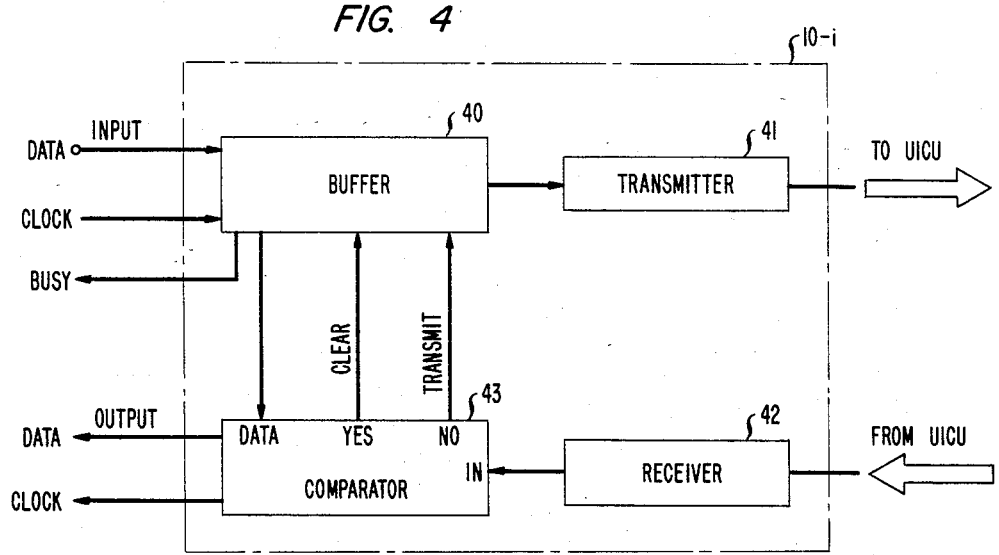
FIG. 4 shows an illustrative user terminal for carrying out the user protocol.

FIG. 4 shows a typical user terminal 10-i for carrying out the user protocol. Each terminal includes a buffer 40 coupled to a transmitter 41 and to a comparator 43. A receiver 42 is also coupled to comparator 43 whose outputs are connected to buffer 40. Input packets are stored in the buffer and comparator. So long as the received packet is different than the stored packet, the packet is retransmitted. When a match is obtained, the buffer is cleared. Packets that do not match the transmitted packet and are addressed to the local user are filtered by the comparator and appear at the data output port.

Figure 5:
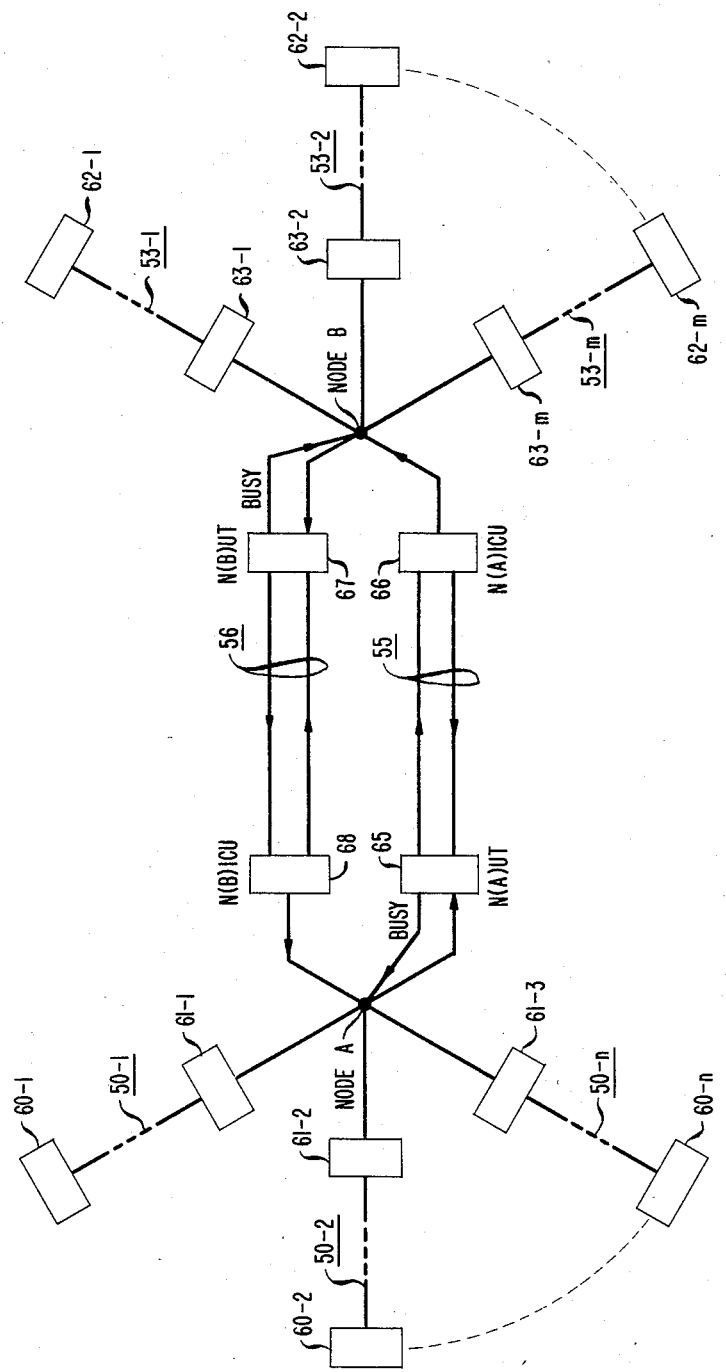
FIG. 5 shows the application of the principles of the invention between pairs of remote nodes.

The collision avoidance method of controlling traffic among a plurality of users connected to a common node can also be employed to control traffic between a pair of remote anodes, as illustrated in FIG. 5. In this Figure two nodes, A and B, are shown. Each node has its local users connected in the manner shown in FIG. 1. Thus, for example, node A has n user links, 50-1, 50-2, ... 50-n, each of which includes a user terminal, 60-1, 60-2, ... 60-n, and an associated user interface control unit, 61-1, 61-2, ... 61-n. Similarly, node B has m user links, 53-1, 53-2, ... 53-m, each of which includes a user terminal, 62-1, 62-2, ... 62-m, and an associated user interface control unit, 63-1, 63-2, ... 63-m. In addition, the two nodes are connected together by means of a pair of node links 55 and 56, where link 55 provides transmission from node A to node B, and link 56 provide transmission from node B to node A.

Insofar as node A is concerned, node B is just another user. Accordingly, link 56 is provided with a node user terminal, (N(B)UT) 67, located at node B, and an associated node interface control unit, (N(B)ICU) 68, located at node A. Similarly, insofar as node B is concerned, node A is just another user. Accordingly, link 55 is also provided with a node user terminal (N(A)UT) 65, located at node A, and an associated node interface control unit, (N(A)ICU) 56, located at node B.

In operation, transmissions received at a node (i.e., A) and addressed to a user at another node (i.e., B) are stored in the node user buffer at A until the receiving node B is "idle". If however, the buffer is full and the packet cannot be properly stored, a busy burst is generated. The function of the busy burst is to garble the packet that captured the node but was, in fact, lost because the node user buffer was unable to store it. This informs the originating user that the packet should be retransmitted as in the case of a "busy" local node. In all other respects the node user terminals and the node interface units operate in the manner described hereinabove with reference to FIG. 1.

Figure 6:
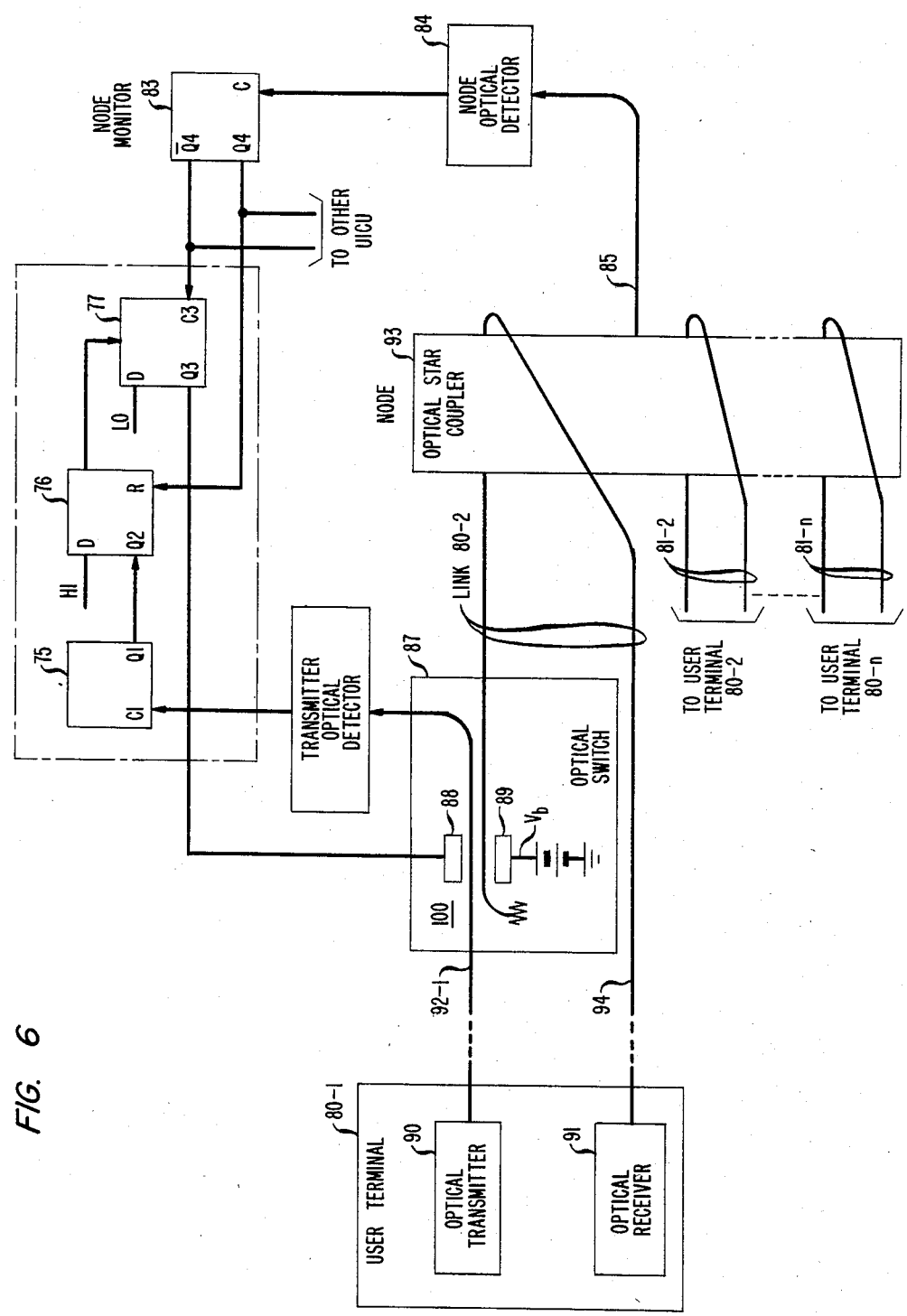
FIG. 6 shows the application of the principles of the invention to optical communication systems.

FIG. 6 shows a second embodiment of the invention for use in an optical communication system. In this embodiment, each user terminal, such as 80-1, is provided with an optical transmitter 90 and an optical receiver 91 for converting between electrical and optical signals. The transmission lines (such as 92-1, 92-2, and 94) in the communication links, 81-1, 81-2 ... 81-n, connecting the user terminals to the common node are typically multimode optical fibers. The node itself is an optical star coupler 93 which serves to couple all the links together.

The user interface control unit are similar to that described in connection with FIG. 2. Each includes a transmitter monitor 75, an arbiter 76 and an hold-on flip-flop 77. However, the AND-gate is replaced by an optical switch 87 located in the transmit line 92 of the optical link. In addition, a transmitter optical detector 86, for converting between optical and electrical signals, is located between switch 87 and transmitter monitor 75.

Figure 2:
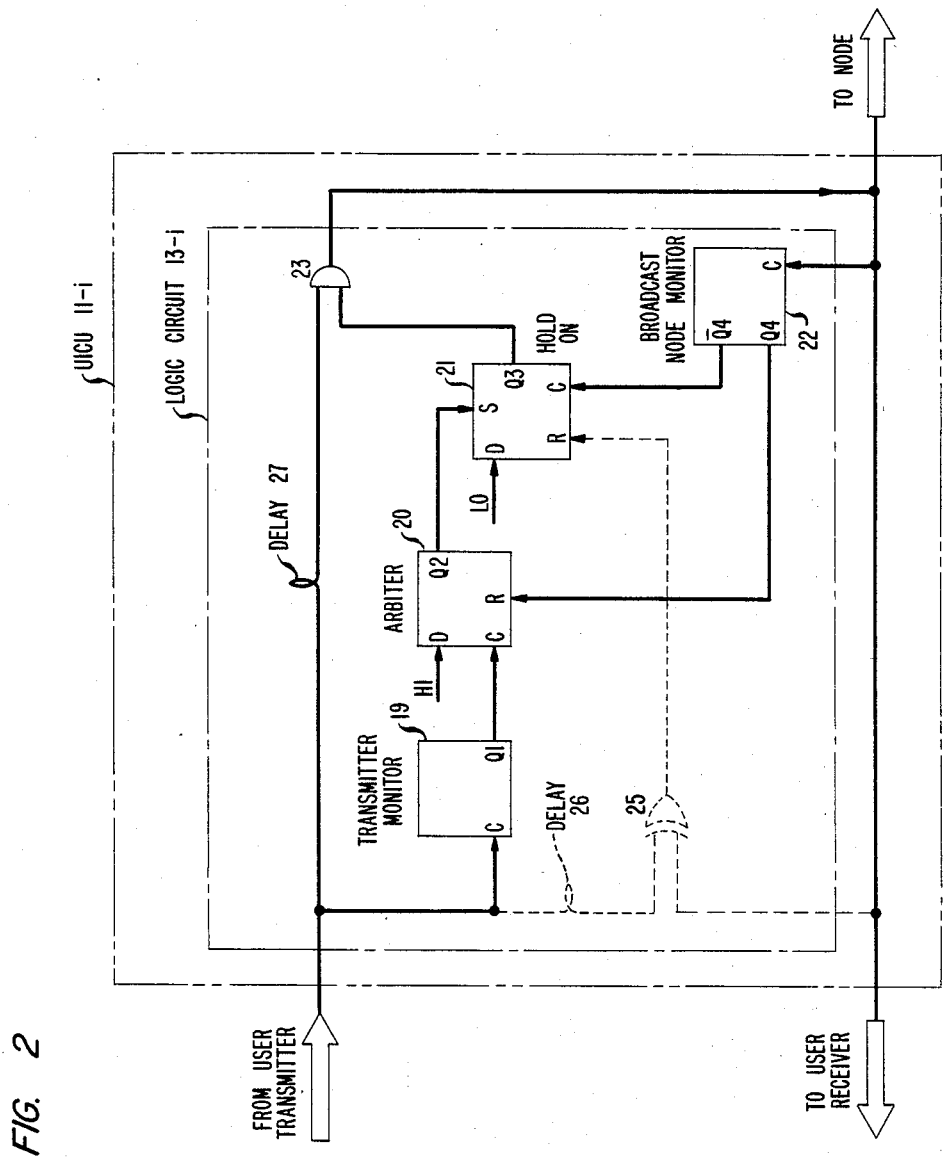
FIG. 2 is an illustrative embodiment of a logic circuit for practicing the invention.

In the illustrative logic unit 13-i in FIG. 2, a separate node monitor 22 is shown. However, it is not necessary to include a node monitor in each logic unit. A common monitor can be shared by all the UICUs, as illustrated in FIG. 6, wherein a common node monitor 83 is shown providing signals Q4 and $\overline{Q4}$ to all the UICUs. Also provided is a node optical detector 84 which converts optical signals, coupled out of the node by means of an optical fiber 85, to electrical signals which are in turn, coupled to the node monitor 83.

Optical switch 87 comprises a directional coupler 100 formed by portions of fibers 92-1 and 92-2 and electrodes 88 and 89. Initially, with Q3 low, and a voltage $V_b$ applied to electrode 89, the switch is biased "off". In this condition, there is no coupling between transmission lines 92-1 and 92-2. Thus, when the user transmits, the signal initially is coupled to the transmitter optical detector 86. If the node is idle, Q3 will go high, as explained in connection with FIG. 1. With Q3 high, the switch is turned "on", and the signal is coupled to the star coupler and onto the node. If, on the other hand, the node was "busy" when the transmission is sensed, Q3 remains low and the transmission is ignored. In case of a power failure, the bias voltage $V_b$ is turned off and all switches are turned on. This serves to connect all the users to the node, thereby temporarily converting the network to a contention system as a fail-safe feature.

What is claimed is:

1. Digital transmission system for controlled transmission of signal packets among a plurality of users, the system comprising a plurality of user links that terminate at a first node, at least one of these user links comprising
    (a) a user station comprising signal packet transmitting means;
    (b) transmission line means connecting the transmitting means to a first signal-sensing means having at least a "busy" and an "idle" state, the first signal-sensing means being in the busy state whenever a signal packet is arriving at the first signal-sensing means from the transmitting means, and in the idle state otherwise;
    (c) second signal-sensing means, connected to the first node, the second signal-sensing means having at least a "busy" and an "idle" state, being in the busy state if the first node carries a signal packet, and in the idle state otherwise;
    (d) third means, responsive to the first signal-sensing means and to the second signal-sensing means, for connecting the transmitting means to the first node if the second signal-sensing means are in the idle state when the state of the first signal-sensing means changes from the idle to the busy state upon arrival of a signal packet at the first signal-sensing means from the transmitting means; and
    (e) the transmitting means are adapted for transmitting a signal packet to the first signal-sensing means independent of the state of the second signal-sensing means, and for later retransmitting the same signal packet to the first signal-sensing means if the second signal-sensing means were in the busy state when the first signal-sensing means were in the busy state at the time of arrival of the transmitted signal packet at the first signal-sensing means.

2. The system, according to claim 1 wherein each link comprises:
    a user interface control unit located at and connected to said node;
    and a transmission link connecting said user station to said control unit.

3. The system according to claim 1 wherein said node is a length l of bus, given by $$1 \leq vt/2,$$

where
- v is the velocity of signal propagation on the bus; and
- T is the digital signal bit period.

4. The system according to claim 2 wherein each user station includes:
- means for storing a digital message;
- means for transmitting said message along said transmission link to said control unit;
- means for receiving messages from said control unit;
- means for comparing received messages with said stored message, and for retransmitting said stored message until a received message is the same as said transmitted message.

5. The system according to claim 2 wherein each control unit includes:
- means for receiving messages from said user terminal;
- switching means for coupling said receiving means to said node;
- said switching means being open in the absence of a message;
- said switching means being closed upon receipt of a message when said node is in an "idle" state, but remaining open when said node is in a "busy" state.

6. The system according to claim 5 wherein the transmission link comprises a pair of optical fibers; and wherein said switch is a switchable optical directional coupler.

7. System of claim 1, wherein each user link that terminates at the first node comprises the elements of (a), (b), (c), (d), and (e) of claim 1.

8. System of claim 1, further comprising
- at least one second node remote from the first node;
- at least one user link connected to the second node;
- interconnecting means comprising first and second node links, the first node link providing a path for transmission of digital signals from the first to the second node, and the second node link providing a path for transmission of digital signals from the second to the first node, each node link comprising:
- means for storing a signal to be transmitted from a transmitting node to a receiving node;
- means for transmitting the stored signal between the nodes in the appropriate direction along the link;
- means for monitoring the status of the receiving node; and
- means, responsive to the means for monitoring the status of the receiving node, for causing transmission of the stored signal from the transmitting node to the receiving node if the status of the receiving node is idle.

9. System of claim 8, further comprising means, associated with the transmitting station, for generating a busy burst when a signal packet arrives at the signal storage means from a first user station associated with the transmitting node when the signal storage means are full, the busy burst to be transmitted to at least the first user station.

10. System of claim 1, wherein at least some of the user links comprise optical signal generating means, and optical fiber means for guiding the optical signal.

* * * * *